United States Patent [19]

Mizuta

[11] Patent Number: 5,687,048
[45] Date of Patent: Nov. 11, 1997

[54] MAGNETIC DISK CARTRIDGE AND PROCESS FOR PRODUCING THE SAME

[75] Inventor: Akira Mizuta, Kanagawa-ken, Japan

[73] Assignees: Fuji Photo Film Co., Ltd., Tokyo, Japan; Iomega Corporation, Roy, Utah

[21] Appl. No.: 583,480

[22] Filed: Jan. 5, 1996

[30] Foreign Application Priority Data

Feb. 17, 1995 [JP] Japan ................................. 7-029604

[51] Int. Cl.$^6$ ................................................ G11B 23/03
[52] U.S. Cl. ............................................................ 360/133
[58] Field of Search .................................................. 360/133

[56] References Cited

U.S. PATENT DOCUMENTS

| 4,843,511 | 6/1989 | Downey. | |
|---|---|---|---|
| 4,864,451 | 9/1989 | Iwasa et al. | 360/133 |
| 4,977,475 | 12/1990 | Shiba et al. | 360/133 |
| 4,985,799 | 1/1991 | Doi | 360/133 |
| 5,282,106 | 1/1994 | Saito et al. | 360/133 |
| 5,455,109 | 10/1995 | Atkinson et al. | 360/133 X |

FOREIGN PATENT DOCUMENTS

| 58-128064A | 7/1983 | Japan | 360/133 B |
|---|---|---|---|
| 60-20374A | 2/1985 | Japan | 360/133 B |
| 63-32778A | 2/1988 | Japan | 360/133 B |
| 1-105372 | 4/1989 | Japan | 360/133 B |
| WO 94/24022 | 10/1994 | WIPO | 360/133 |

*Primary Examiner*—John H. Wolff
*Attorney, Agent, or Firm*—Sughrue,Mion,Zinn,Macpeak & Seas, PLLC

[57] ABSTRACT

A magnetic disk cartridge comprising a disk shell, formed by a pair of shell halves each defining an inner surface in which a magnetic disk is incorporated such that the magnetic disk can rotate, and a liner applied to the inner surface of at least one of the shell halves of the disk shell, which inner surface is disposed facing the magnetic disk. A plurality of recesses and protruding portions are formed in a liner applying region of the inner surface of the disk shell, and the liner is applied to the inner surface of the disk shell such that the liner may be adhered at least to positions in the recesses and pulled by the protruding portions. The magnetic disk cartridge has no risk that the liner becomes slackened even when ambient conditions change, and the weight of the disk shell is kept light.

18 Claims, 4 Drawing Sheets

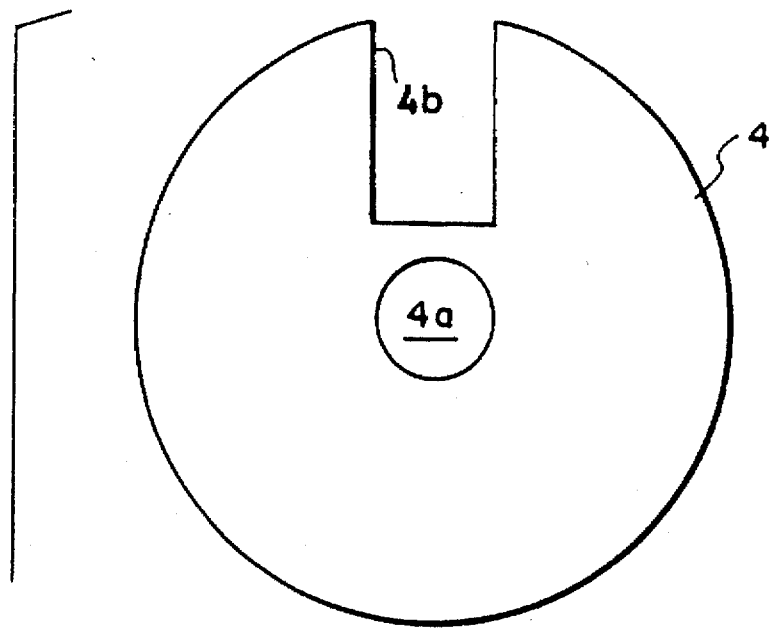
F I G. 1
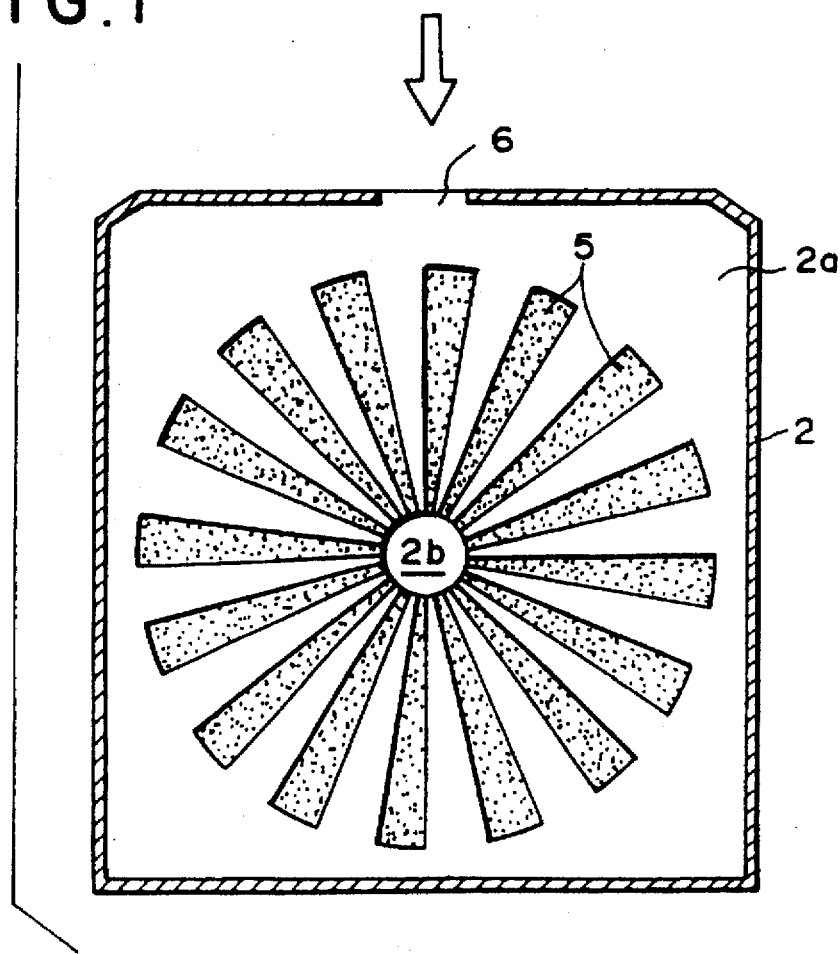

MAGNETIC DISK CARTRIDGE AND PROCESS FOR PRODUCING THE SAME

BACKGROUND OF THE INVENTION

1. Field of the Invention

This invention relates to a magnetic disk cartridge and a process for producing the magnetic disk cartridge. This invention particularly relates to a magnetic disk cartridge, wherein a liner is applied to the inner surface of a disk shell, in which a magnetic disk is incorporated such that the magnetic disk can rotate, and a process for producing the magnetic disk cartridge.

2. Description of the Prior Art

Magnetic disk cartridges comprise a thin type of disk shell formed by a pair of shell halves, and a magnetic disk, which is incorporated in the disk shell such that it can rotate and on which analog or digital signals are to be recorded magnetically. The disk shell takes on the form of a flat prismatic shape and comprises an approximately square top surface having an area slightly larger than the area of the magnetic disk, a bottom surface having an opening, through which a center core for supporting the center of the magnetic disk is exposed to the exterior, and a side surface having a narrow width and extending between the periphery of the top surface and the periphery of the bottom surface. The magnetic disk cartridge is provided with an opening for insertion of a magnetic head, through which the magnetic head for magnetically recording and reproducing signals is to be inserted from the exterior such that the magnetic head can be brought into contact with the surfaces of the magnetic disk or can be brought to positions close to the surfaces of the magnetic disk. Also, the magnetic disk cartridge is provided with a shutter for opening and closing the opening for insertion of the magnetic head. When the magnetic disk cartridge is not used, the shutter closes the opening for insertion of the magnetic head such that dust, debris, or the like, may not enter into the magnetic disk cartridge.

Liners constituted of nonwoven fabrics, or the like, are applied to the inner surfaces of the disk shell halves, which are disposed facing the magnetic disk. When the magnetic disk is rotated, the liners serve to prevent the surfaces of the magnetic disk from being scratched and to remove dust, debris, or the like, from the surfaces of the magnetic disk.

In conventional magnetic disk cartridges, there is a sufficient spacing in the disk shell along the thickness direction of the magnetic disk accommodated therein. Each of the liners is pushed up from the inner surface of the disk shell half by a weak leaf spring-like lifter. The liner is thereby urged toward the magnetic disk and kept in sufficient contact with the magnetic disk. Therefore, the entire area of the liner is not adhered to the inner surface of the disk shell. For example, only the peripheral portions of the liner are adhered to the inner surface of the disk shell with ultrasonic welding, or the like.

Recently, a magnetic disk cartridge, which has a recording capacity 50 times as large as the recording capacity of the conventional magnetic disk cartridge (3.5-inch floppy disk) by virtue of a new high-density recording system, has been developed. In the recently developed magnetic disk cartridge, in order for a high recording density and a high signal transfer rate to be obtained, the magnetic disk is rotated at a markedly higher speed than the speed, at which the magnetic disk in the conventional magnetic disk cartridges is rotated. Also, when signals are recorded on the magnetic disk accommodated in the recently developed magnetic disk cartridge and are reproduced therefrom, the position of the magnetic disk must be adjusted with a very high accuracy with respect to a magnetic head.

In cases where there is a large spacing in the disk shell as in the conventional magnetic disk cartridges, vibrations are apt to occur, the accuracy of the position of the magnetic disk with respect to the magnetic head cannot always be kept high, and other drawbacks are encountered. Therefore, in order for the requirements for the quick rotation and the high positional accuracy to be satisfied, it is not desirable that there is a large spacing within the disk shell. Instead, approximately the entire area of the liner, which has been applied to the inner surface of the disk shell, and the magnetic disk, should be kept in slight contact with each other with a high accuracy.

However, in general, the liners constituted of nonwoven fabrics, or the like, have moisture absorbing properties and expand or contract due to a change in ambient conditions, particularly a change in humidity. Therefore, when the magnetic disk cartridge is placed in a high-humidity atmosphere, the liner located in the magnetic disk cartridge becomes slackened, and there occurs the risk that undesirable local contact occurs between the slackened liner and the magnetic disk.

If the slackened liner comes into undesirable contact with the quickly rotating magnetic disk, the stable, quick rotation of the magnetic disk will be obstructed. Also, a failure will occur due to heat generated at portions of contact between the slackened liner and the magnetic disk due to or electrostatic charges generated by the contact therebetween.

Further, in an example of a magnetic disk cartridge, an opening for insertion of the magnetic head is formed in one of side surfaces of the disk shell, which opening has a size allowing access to the surfaces of the magnetic disk from the exterior. In such cases, a magnetic head for recording and reproducing signals is inserted through the opening provided for insertion of the magnetic head and brought to a position in the vicinity of the quickly rotating magnetic disk in order to record signals on the magnetic disk or to reproduce signals from the magnetic disk. Therefore, it is necessary for the disk shell to have a predetermined thickness that enables the insertion of the magnetic head.

The magnetic disk, which is quickly rotated in the disk shell, is constituted of a flexible material. Therefore, it is necessary for a flapping motion of the magnetic disk during its rotation to be restricted. For such purposes, high-accuracy appropriate dimensions (in general, the dimensions of the sum of the thickness of the magnetic disk, the thickness of the liners, and slight clearances) are required in the internal space of the disk shell. In order for the dimensions to be obtained with a high accuracy, the disk shell should have a sufficient rigidity, and therefore it should have sufficient thickness.

For the reasons described above, it is necessary that the thickness of the disk shell be, for example, at least two times as large as the thickness (approximately 3 mm) of the disk shell of the conventional 3.5-inch floppy disk. In such cases, the wall thicknesses of the disk shell halves, which are combined with and secured to each other to constitute the disk shell, become considerably thick.

However, the problem occurs in that the disk shell having such a thick-wall structure becomes heavy in weight. Further, large amounts of materials and long molding time spans are required during the production of the disk shell, and therefore the cost of the disk shell cannot be kept low.

SUMMARY OF THE INVENTION

The primary object of the present invention is to provide a magnetic disk cartridge, wherein there is no risk that a liner becomes slackened even when ambient conditions change, and wherein the weight of a disk shell is kept light.

Another object of the present invention is to provide a process for producing the magnetic disk cartridge.

The present invention provides a magnetic disk cartridge comprising a disk shell, formed by a pair of shell halves each defining an inner surface, in which a magnetic disk is incorporated such that the magnetic disk can rotate, and a liner applied to the inner surface of at least one of the shell halves the disk shell, which inner surface is disposed facing the magnetic disk, wherein a plurality of recesses are formed in a liner applying region of the inner surface of at least one shell half of the disk shell, and the liner is applied to the inner surface of the at least one shell half of the disk shell such that the liner is adhered at least to positions in the recesses.

Specifically, the recesses, which are formed in the liner applying region of the inner surface of the disk shell, may be disposed in a radial pattern extending radially from a point, which stands facing the center point of the magnetic disk. Alternatively, the recesses, which are formed in the liner applying region of the inner surface of the disk shell, may be disposed in a checkered pattern. As another alternative, the recesses, which are formed in the liner applying region of the inner surface of the disk shell, may be disposed in a spiral pattern extending spirally from a point, which stands facing the center point of the magnetic disk. (If the recesses are located in a concentric circle pattern, the contact pressure between the liner and the magnetic disk will vary for different tracks on the magnetic disk. Therefore, the concentric circle pattern is not preferred.)

Further, the liner may be applied to the inner surface of the disk shell such that the liner may also be adhered to portions of the inner surface of the disk shell, which portions are located between the recesses.

The present invention also provides a process for producing a magnetic disk cartridge comprising a disk shell, formed by a pair of shell halves each defining an inner surface, in which a magnetic disk is incorporated such that the magnetic disk can rotate, and a liner applied to the inner surface of at least one of the shell halves of the disk shell, which inner surface is disposed facing the magnetic disk, the process comprising the steps of:

i) forming a plurality of recesses in a liner applying region of the inner surface of the disk shell, and ii) adhering the liner at least to positions in the recesses.

In the process for producing a magnetic disk cartridge in accordance with the present invention, the step of adhering the liner at least to positions in the recesses may be carried out with an ultrasonic welding technique.

With the magnetic disk cartridge in accordance with the present invention, a plurality of recesses are formed in the liner applying region of the inner surface of the disk shell, and the liner is adhered at least to the positions in the recesses. Therefore, the liner is always pulled by the protruding portions, which are the portions of the inner surface of the disk shell located between the recesses. Accordingly, even if the magnetic disk cartridge is used under high-humidity ambient conditions, there will be no risk that the liner becomes slackened, and the torque given by the liner to the magnetic disk can be kept constant.

Also, in cases where the recesses are disposed in the radial pattern, the checkered pattern, or the spiral pattern, approximately the entire area of the liner can be uniformly brought into contact with the magnetic disk with a high accuracy.

Further, since a plurality of the recesses are formed in the inner surface of the disk shell, the weight of the disk shell can be kept small, and its production can be kept high.

BRIEF DESCRIPTION OF THE DRAWINGS

FIG. 1 is a plan view showing a liner and a pattern of recesses, which are formed in a liner applying region of the inner surface of a disk shell half in a first embodiment of the magnetic disk cartridge in accordance with the present invention.

DESCRIPTION OF THE PREFERRED EMBODIMENTS

Figure 2:
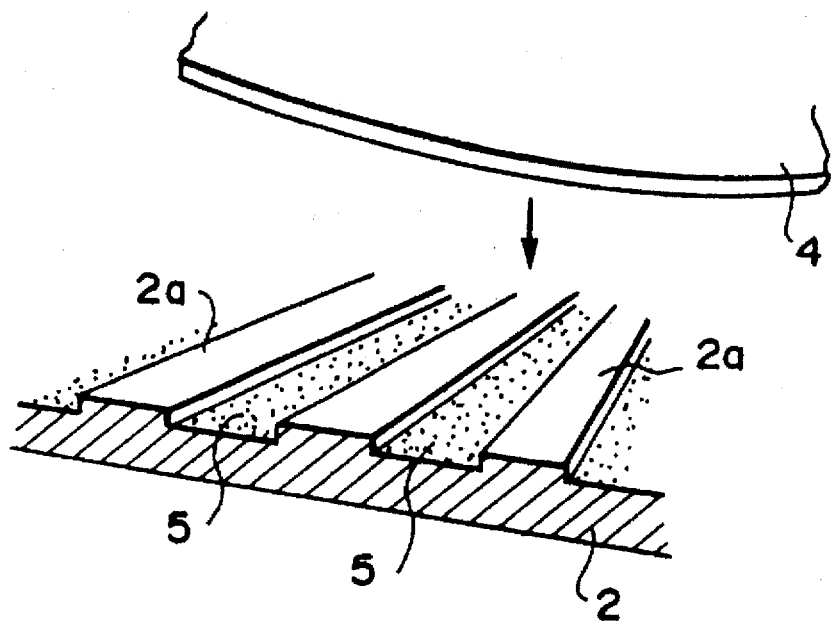
FIG. 2 is an enlarged perspective view showing part of the liner and part of the recesses shown in FIG. 1.

The present invention will hereinbelow be described in further detail with reference to the accompanying drawings.

FIG. 1 shows a first embodiment of the magnetic disk cartridge in accordance with the present invention. A disk jacket or shell of the magnetic disk cartridge is constituted of a pair of disk shell halves, one of which is shown in FIG. 1. A disk shell half 2 has a circular hole 2b, through which a center core for supporting the center point of a magnetic disk is exposed to the exterior.

A doughnut-shaped liner 4 has approximately the same shape as the magnetic disk (not shown) and is provided with a circular hole 4a, which is slightly larger than the circular hole 2b. The liner 4 is applied to an inner surface 2a of the disk shell half 2 such that the circular hole 2b and the circular hole 4a may be aligned with each other.

Figure 3:
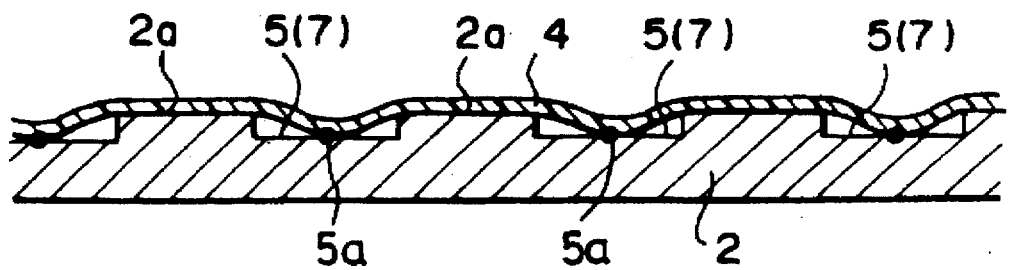
FIG. 3 is an enlarged sectional view showing the liner applied to the inner surface of the disk shell half.

In this embodiment, a plurality of recesses 5, 5, . . . are formed in the region of the inner surface 2a of the disk shell half 2, to which region the liner 4 is to be applied. As illustrated in FIG. 2, the recesses 5, 5, . . . are located in a radial pattern extending radially outwardly from the circular hole 2b. As illustrated in FIG. 3, the liner 4 is applied to the inner surface 2a of the disk shell half 2 such that the liner 4 may be adhered with ultrasonic welding at least at welding points 5a, 5a, . . . in the recesses 5, 5, . . . , which are located in the radial pattern. In FIG. 1, the recesses 5, 5, . . . located in the radial pattern are indicated by putting small dots to the recesses 5, 5, . . . .

As described above, the liner 4 is adhered to the positions in the recesses 5, 5, . . . . Therefore, the liner 4 is always pulled by the protruding portions, which are located between the recesses 5, 5, . . . . Accordingly, even if the magnetic disk cartridge is used under high-humidity ambient conditions, there will be no risk that the liner 4 becomes slackened, and the torque given by the liner 4 to the magnetic disk can be kept constant.

Further, since the plurality of the recesses 5, 5, . . . are formed in the inner surface of the disk shell, the weight of the disk shell can be kept small, and its production can be kept high.

The same recesses 5, 5, . . . are also formed in the radial pattern in the inner surface of the other (or second) disk shell half. A liner 4 is applied to the inner surface of the other or second disk shell half in the same manner as that in the first disk shell half 2. The portion of the liner 4 which stands facing the other end of the center core, should preferably be provided with a circular hole such that the liner 4 may not interfere with the center core.

Also, in this embodiment, the disk shell half 2 is provided with an opening 6 for insertion of a magnetic head, through which the magnetic head for magnetically recording and reproducing signals is to be inserted from the exterior such that the magnetic head can be brought into contact with the surfaces of the magnetic disk or can be brought to positions close to the surfaces of the magnetic disk. The opening 6 for insertion of the magnetic head is formed by cutting away a portion of a side wall of the disk shell half 2. The top and bottom surfaces of the disk shell are not provided with an opening for insertion of the magnetic head. The liner 4 is provided with a cutaway portion 4b for insertion of the magnetic head. The cutaway portion 4b for insertion of the magnetic head is formed by cutting away a portion of the liner 4 in the radial direction. The cutaway portion 4b for insertion of the magnetic head may continue into the circular hole 4a.

The ultrasonic welding of the liner 4 to the inner surface 2a of the disk shell half 2 may be carried out only at the positions in the recesses 5, 5, . . . . Alternatively, the ultrasonic welding of the liner 4 may be carried out at the positions in the recesses 5, 5, . . . and at the protruding portions, which are located between the recesses 5, 5, . . . , i.e., at positions on the inner surface of the disk shell half 2. In the latter case, the liner 4 should preferably be firstly welded to the protruding portions and then be welded to the positions in the recesses 5, 5, . . . .

Also, a protruding portion, which has a top surface located at a level lower than the inner surface 2a of the disk shell half 2, may be formed on the bottom surface of each of the recesses 5, 5, . . . . The liner 4 may then be welded to the top surface of the protruding portion formed in the recess 5.

Figure 4:
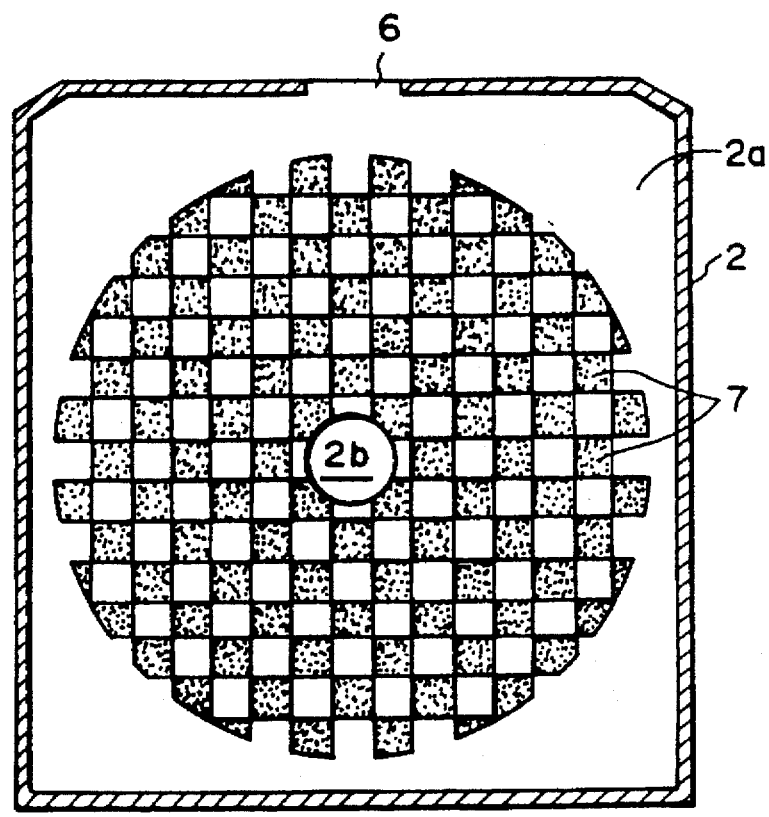
FIG. 4 is a plan view showing a pattern of recesses, which are formed in a liner applying region of the inner surface of a disk shell half in a second embodiment of the magnetic disk cartridge in accordance with the present invention.
Figure 5:
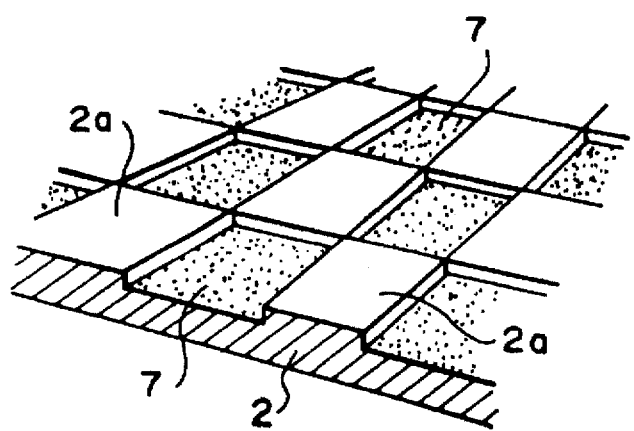
FIG. 5 is an enlarged perspective view showing part of the recesses shown in FIG. 4.
Figure 6:
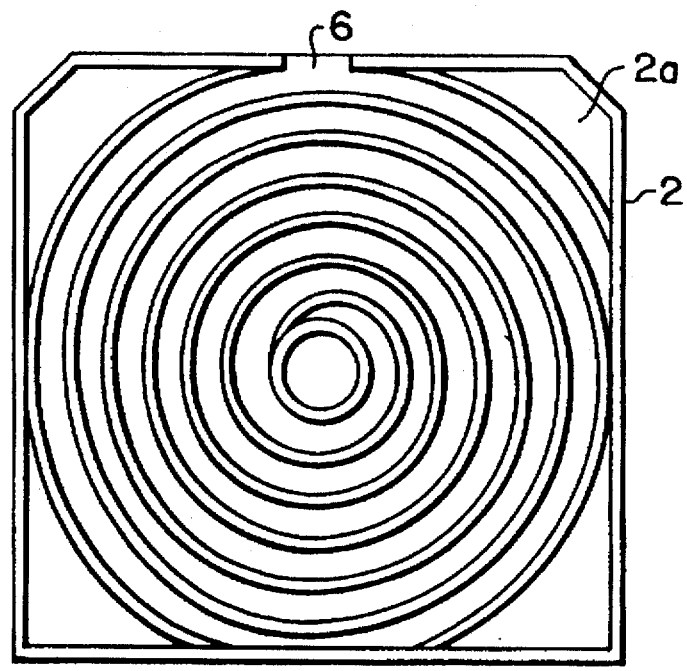
FIG. 6 is a plan view showing another embodiment of the magnetic disk cartridge in accordance with the present invention, wherein a spiral pattern of recess is formed in a liner applying region of the inner surface of the disk shell.
Figure 7:
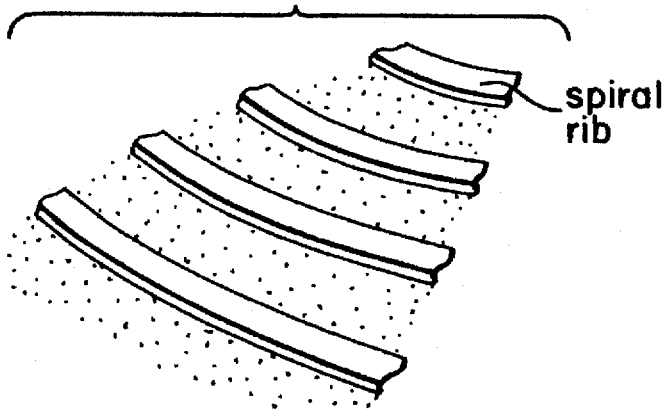
FIG. 7 is an enlarged perspective view showing part of the recesses shown in FIG. 6.
Figure 8:
FIG. 8 is an enlarged sectional view showing the liner applied to the inner surface of the disk shell.

FIG. 4 shows a second embodiment of the magnetic disk cartridge in accordance with the present invention. In this embodiment, a plurality of recesses 7, 7, . . . are formed in the region of the inner surface 2a of the disk shell half 2, to which region the liner 4 is to be applied. As illustrated in FIG. 5, the recesses 5, 5, . . . are located in a checkered pattern. In the same manner as that shown in FIG. 3, the liner 4 is applied to the inner surface 2a of the disk shell half 2 such that the liner 4 may be adhered with ultrasonic welding at least to the positions in the recesses 7, 7, . . . which are located in the checkered pattern. In FIG. 4, the recesses 7, 7, . . . located in the checkered pattern are indicated by putting small dots to the recesses 7, 7, . . . .

The recesses, which are formed in the liner applying region of the inner surface 2a of the cassette shell half 2, may be located in various other patterns. For example, though not shown, the recesses may be located in a spiral pattern extending spirally from the point, which stands facing the center point of the magnetic disk, or in a composite pattern of the radial pattern and the spiral pattern.

What is claimed is:

1. A magnetic disk cartridge comprising a disk shell, formed by a pair of shell halves each defining an inner surface, in which a magnetic disk is incorporated such that the magnetic disk can rotate, and a liner applied to the inner surface of at least one of the shell halves of the disk shell, which inner surface is disposed facing the magnetic disk, wherein a plurality of recesses and protruding portions are formed in a liner applying region of the inner surface of the at least one shell half of the disk shell, and the liner is applied to the inner surface of the at least one shell half of the disk shell such that the liner is adhered at least to positions in said recesses and is always pulled by the protruding portions.

2. A magnetic disk cartridge as defined in claim 1 wherein said recesses, which are formed in said liner applying region of the inner surface of the disk shell, are located in a radial pattern extending radially from a point, which stands facing the center point of the magnetic disk.

3. A magnetic disk cartridge as defined in claim 2, wherein the liner is applied to the inner surface of the disk shell such that the liner may also be adhered to and pulled by the protruding portions of the inner surface of the disk shell, which protruding portions are located between said recesses.

4. A magnetic disk cartridge as defined in claim 1 wherein said recesses, which are formed in said liner applying region of the inner surface of the disk shell, are located in a checkered pattern.

5. A magnetic disk cartridge as defined in claim 4, wherein the liner is applied to the inner surface of the disk shell such that the liner may also be adhered to and pulled by the protruding portions of the inner surface of the disk shell, which protruding portions are located between said recesses.

6. A magnetic disk cartridge as defined in claim 1 wherein said recesses, which are formed in said liner applying region of the inner surface of the disk shell, are located in a spiral pattern extending spirally from a point, which stands facing the center point of the magnetic disk.

7. A magnetic disk cartridge as defined in claim 6, wherein the liner is applied to the inner surface of the disk shell such that the liner may also be adhered to and pulled by the protruding portions of the inner surface of the disk shell, which protruding portions are located between said recesses.

8. A magnetic disk cartridge as defined in claim 1, wherein the liner is applied to the inner surface of the disk shell such that the liner may also be adhered to and pulled by the protruding portions of the inner surface of the disk shell, which protruding portions are located between said recesses.

9. A process for producing a magnetic disk cartridge comprising a disk shell, formed by a pair of shell halves each defining an inner surface, in which a magnetic disk is incorporated such that the magnetic disk can rotate, and a liner applied to the inner surface of at least one of the shell halves of the disk shell, which inner surface is disposed facing the magnetic disk, the process comprising the steps of:

i) forming a plurality of recesses and protruding portions in a liner applying region of the inner surface of the at least one shell half of the disk shell, and ii) adhering the liner at least to positions in said recesses such that the liner is always pulled by the protruding portions.

10. A process as defined in claim 9 wherein the step of adhering the liner at least to positions in said recesses is carried out with an ultrasonic welding technique.

11. A process as defined in claim 10, wherein the liner is applied to the inner surface of the disk shell such that the liner may also be adhered to and pulled by protruding portions of the inner surface of the disk shell, which protruding portions are located between said recesses.

12. A process as defined in claim 9 wherein said recesses, which are formed in said liner applying region of the inner surface of the disk shell, are located in a radial pattern extending radially from a point, which stands facing the center point of the magnetic disk.

13. A process as defined in claim 12, wherein the liner is applied to the inner surface of the disk shell such that the liner may also be adhered to and pulled by protruding portions of the inner surface of the disk shell, which protruding portions are located between said recesses.

14. A process as defined in claim 9 wherein said recesses, which are formed in said liner applying region of the inner surface of the disk shell, are located in a checkered pattern.

15. A process as defined in claim 14, wherein the liner is applied to the inner surface of the disk shell such that the liner may also be adhered to and pulled by protruding portions of the inner surface of the disk shell, which protruding portions are located between said recesses.

16. A process as defined in claim 9 wherein said recesses, which are formed in said liner applying region of the inner surface of the disk shell, are located in a spiral pattern extending spirally from a point, which stands facing the center point of the magnetic disk.

17. A process as defined in claim 16, wherein the liner is applied to the inner surface of the disk shell such that the liner may also be adhered to and pulled by protruding portions of the inner surface of the disk shell, which protruding portions are located between said recesses.

18. A process as defined in claim 9, wherein the liner is applied to the inner surface of the disk shell such that the liner may also be adhered to and pulled by protruding portions of the inner surface of the disk shell, which protruding portions are located between said recesses.

\* \* \* \* \*